H. SYNCK & B. B. ROLLMAN.
FEEDING MECHANISM.
APPLICATION FILED SEPT. 18, 1916.
1,218,491.
Patented Mar. 6, 1917.
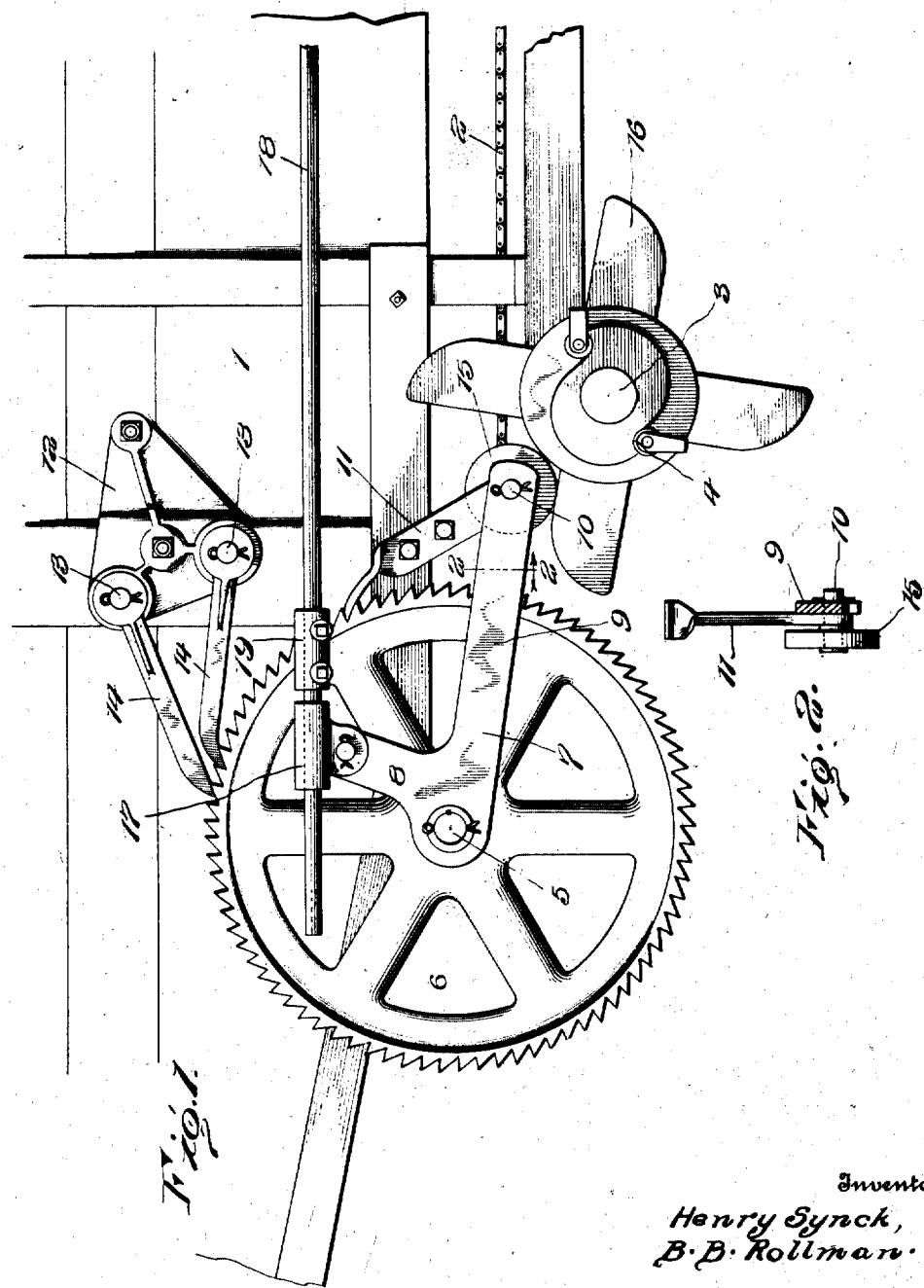
Inventors
Henry Synck,
B. B. Rollman.
By

UNITED STATES PATENT OFFICE.

HENRY SYNCK AND BRUCE B. ROLLMAN, OF COLDWATER, OHIO, ASSIGNORS TO NEW IDEA SPREADER CO., OF COLDWATER, OHIO.

FEEDING MECHANISM.

1,218,491. Specification of Letters Patent. Patented Mar. 6, 1917.

Application filed September 18, 1916. Serial No. 120,800.

*To all whom it may concern:*

Be it known that we, HENRY SYNCK and BRUCE B. ROLLMAN, citizens of the United States, residing at Coldwater, in the county of Mercer and State of Ohio, have invented certain new and useful Improvements in Feeding Mechanisms, of which the following is a specification.

This invention relates to mechanism for operating the conveyer of fertilizer distributers, and has for its object the provision of a simple, compact and efficient mechanism whereby the conveyer apron will be operated intermittently so as to carry the load at the proper speed to the beaters or distributing cylinders. A further object of the invention is to provide novel means for regulating the feed of the conveyer or the distance through which it moves at each stop.

The invention is illustrated in the accompanying drawings and consists in certain novel features which will be hereinafter first fully described and then more particularly pointed out in the claims following the description.

In the drawings:

Figure 1 is a side elevation of our improved mechanism;

Fig. 2 is a detail section on the line 2—2 of Fig. 1.

Referring particularly to the drawings, the reference numeral 1 indicates a portion of the wagon bed in which the fertilizer is loaded and through which it is fed to the beaters or distributing cylinders. A portion of the lower run of the conveyer chain is shown at 2, and 3 designates the rear axle on which the ground wheels are loosely mounted and which is actuated by said ground wheels through the well-known escapement device, a portion of which is shown at 4. The shaft of the rear roller which supports and actuates the conveyer is shown at 5 and upon said shaft is secured a ratchet wheel 6. An angle lever 7 is loosely mounted at its angle or bend upon the shaft 5 and one arm 8 of said lever extends upwardly from the said shaft while the other arm 9 of the lever extends forwardly in a general direction toward the axle 3. In the forward end of the arm 9 is mounted a pin 10 upon which is pivoted a pawl 11 which extends upwardly and somewhat rearwardly from the pin 10 to engage the ratchet wheel 6, as clearly shown. A bracket 12 is secured to the side of the wagon bed 1 and is constructed with outstanding studs 13 upon which are pivotally mounted dogs 14 which extend rearwardly from the respective studs so as to overhang and rest upon the ratchet wheel 6 and engage the teeth of the same to prevent backward movement thereof. A roller 15 is mounted upon the pin 10 and this roller is disposed in the path of movement of a four-armed cam 16 which is secured upon the axle 3 in any desired manner and has its cam surfaces so disposed that, when the machine is moving forwardly, the several cam arms will ride up against the roller 15 and lift the same and the arm 9 of the lever 7, thereby causing the pawl 11 to exert a lifting action upon the ratchet wheel 6 to partly rotate the same and transmit movement to the conveyer. Upon the extremity of the arm 8 of the lever 7 is loosely mounted a sleeve 17 through which passes an adjusting rod 18 which is controlled through a hand lever at the front end of the machine. Upon the said adjusting rod, we secure a stop collar 19 which is disposed near and in advance of the sleeve 17.

As the machine moves over the ground, the cam arms 16 will successively move upwardly under the roller 15 and lift the same and the front end of the lever 7, thereby causing the pawl 11 to actuate the ratchet wheel, as before stated. As the lever 7 swings about the shaft 5, as its fulcrum, the sleeve 17 will be moved rearwardly and the said sleeve should be so mounted upon the lever and of such size relative to the adjusting rod 18 that the movement will not be impeded. As the cam arm clears the roller 15 the weight of the lever 7 and the parts connected therewith will cause the same to at once swing downwardly, and it will be noticed that the entire weight of the lever is in advance of its fulcrum or the shaft 5. As the lever moves downwardly, the sleeve 17 will be carried forwardly and will impinge against the stop collar 19 so as to arrest the movement and hold the lever in position to be again actuated by the cam. It will be readily understood that by setting the stop collar 19 nearer the vertical plane of the shaft 5, the forward movement of the sleeve 17 may be limited so that the lever will be arrested at a greater distance from the hub of the cam and, consequently, the movement imparted to the lever by the cam will be reduced. In this manner the conveyer apron may be given any desired feeding movement and by moving the adjusting rod 18 rearwardly and setting it at the rear limit of its movement, the lever may be held in such position that it will not be actuated at all by the cams. The machine may then be drawn from field to field without causing any distribution of the fertilizer, as will be readily understood. If the machine be at rest, the remnants of the load may be discharged by reciprocating the rod 18 so as to oscillate the lever 7 by alternately pushing the sleeve 17 rearwardly and then permitting the weight of the parts to bring it forward.

Our improved mechanism is exceedingly simple in the construction and arrangement of its parts and is not apt to get out of order. The operation of the same is direct and positive and does not require the application of a large amount of power.

Having thus described the invention, what is claimed as new is:

1. In a mechanism for the purpose set forth, the combination of a conveyer shaft, an axle disposed in advance of said shaft, a ratchet wheel secured on the shaft, an angle lever fulcrumed upon the shaft and having one arm extending in a general direction toward the axle, a pawl pivotally mounted at the forward end of the lever and engaging the ratchet wheel, a cam on the axle acting on the forward end of the lever to impart movement thereto and means acting upon the upper arm of the lever to regulate the throw.

2. In a mechanism for the purpose set forth, the combination of a conveyer shaft, a ratchet wheel secured on said shaft, an angle lever mounted loosely on the shaft and having one arm extending forwardly therefrom and another arm extending upwardly therefrom, an axle, a cam on the axle adapted to act upon the forward end of the lever, a pawl carried by the forward end of the lever and engaging the ratchet wheel, a sleeve mounted loosely upon the upper end of the upwardly extending arm of the lever, an adjusting rod extending through said sleeve, and a stop collar on said rod in advance of and adjacent the said sleeve.

3. In a mechanism for the purpose set forth, the combination of a conveyer shaft, an axle disposed in advance of said shaft, a ratchet wheel secured on the shaft, a lever fulcrumed on said shaft and extending forwardly therefrom, a pivot pin fitted in the forward end of the lever, a pawl mounted on said pin and engaging the ratchet wheel, a roller also mounted on said pin and a cam secured upon the axle and arranged to move upwardly against said roller.

In testimony whereof we affix our signatures.

HENRY SYNCK. [L. S.]
BRUCE B. ROLLMAN. [L. S.]